C. L. ROWLAND. 2 Sheets—Sheet 1.

VALVE OPERATING MECHANISM.

No. 11,328. Reissued May 2, 1893.

Witnesses,

Sidney R. Hollingsworth

B. Washington Miller

Inventor;

Charles L. Rowland by his attorneys

Baldwin, Davidson & Wright.

THE NORRIS PETERS CO., PHOTO-LITHO., WASHINGTON, D. C.

2 Sheets—Sheet 2.

C. L. ROWLAND.

VALVE OPERATING MECHANISM.

No. 11,328. Reissued May 2, 1893.

Witnesses;

Sidney R. Hollingsworth

A. Washington Miller

Inventor;

Charles L. Rowland, by his attorneys;

Baldwin, Davidson & Wight.

THE NORRIS PETERS CO., PHOTO-LITHO., WASHINGTON, D. C.

UNITED STATES PATENT OFFICE.

CHARLES L. ROWLAND, OF BROOKLYN, NEW YORK.

VALVE-OPERATING MECHANISM.

SPECIFICATION forming part of Reissued Letters Patent No. 11,328, dated May 2, 1893.

Original No. 486,219, dated November 15, 1892. Application for reissue filed January 10, 1893. Serial No. 457,960.

*To all whom it may concern:*

Be it known that I, CHARLES L. ROWLAND, a citizen of the United States, residing at Brooklyn, county of Kings, State of New York, have invented certain new and useful Improvements in Valve-Operating Mechanism, of which the following is a specification.

My invention relates to the operation of valves of hydraulic and gas mains; and its purpose, is to provide a quick-action valve in which the extent of motion of the valve is relatively considerably greater than the extent of motion of the part to be manipulated to effect the opening and closing of the valve. To this end I employ lazy-tongs having the free or rising and falling end pivotally connected with the valve and the opposite end connected to the casing or fixed part of the apparatus and I connect the valve-operating rod or device to the lazy-tongs between said two points of connection. In a specific construction shown herein the lazy-tongs have the ends of their levers at one end free or separated and each connected by means of short links with the valves and the ends of the levers at the other end brought together and pivoted in a fixed axis. In another specific construction illustrated herein the construction above briefly described is reversed *i. e.*, at the free end of the lazy-tongs, the end levers are brought together and pivoted to the valve while the levers at the opposite end are separated, and each connected with the casing by a short link.

This primary feature of the invention, as well as other novel features of my improved structure, are hereinafter specifically described and claimed.

Figure 1:
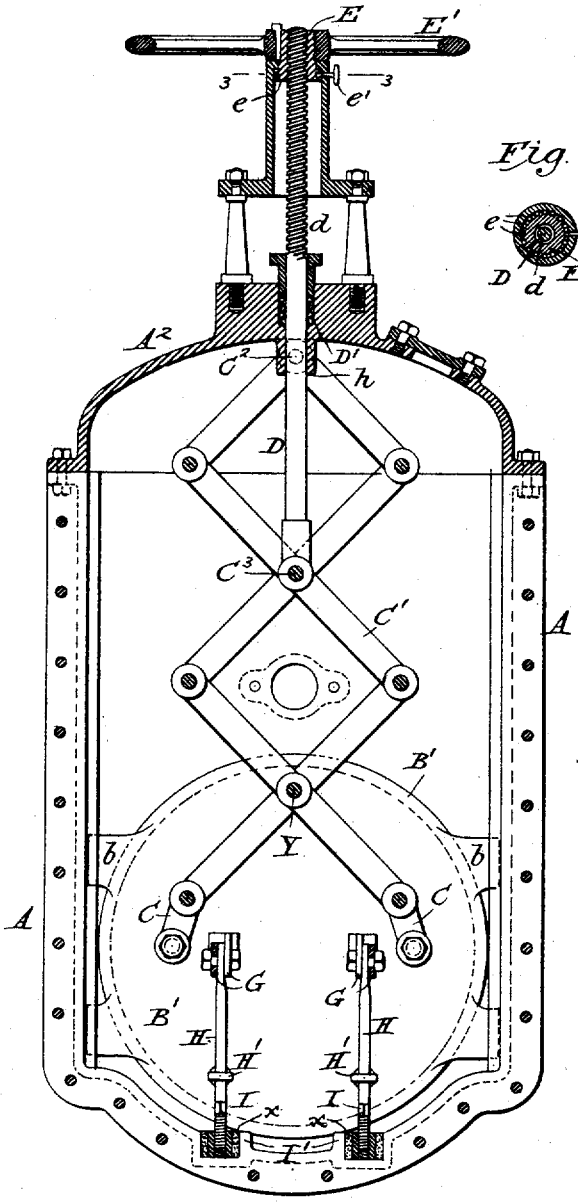
Figure 3:
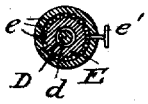
Figure 2:
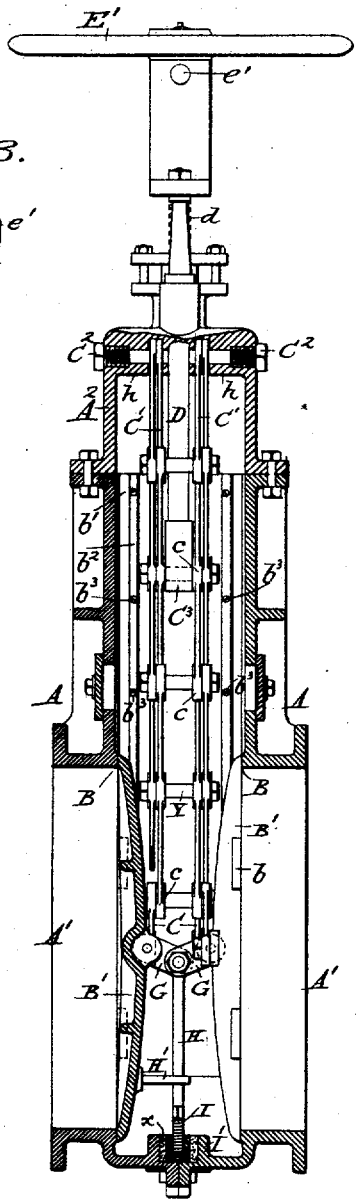
Figure 4:
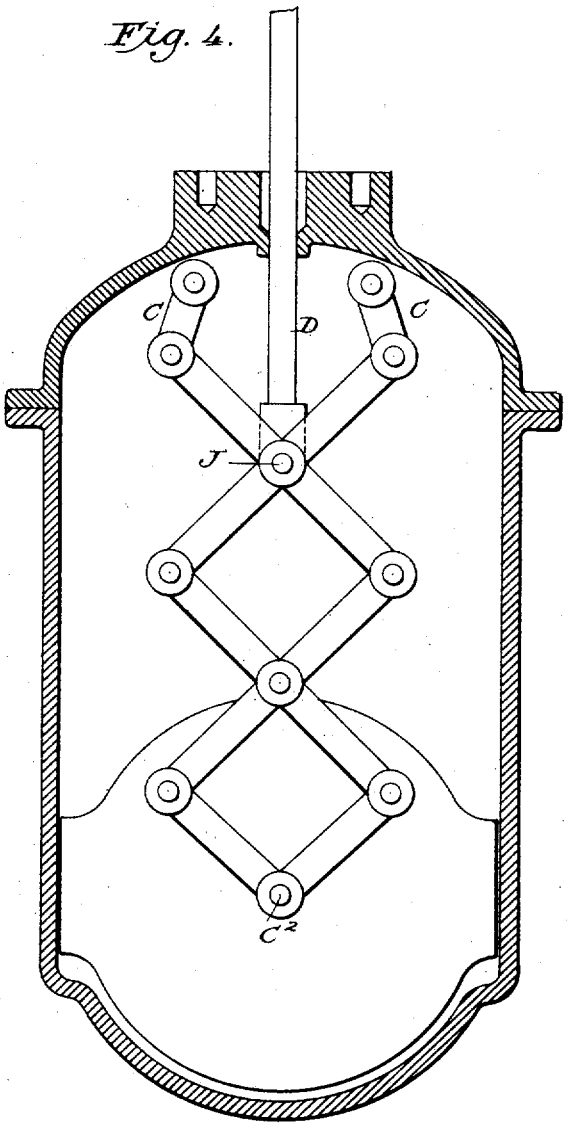

In the accompanying drawings, Figure 1 is a central transverse section. Fig. 2 is a longitudinal section at right angles thereto; Fig. 3, a detail section on the line 3 3 of Fig. 1; and Fig. 4 shows a modified way of connecting the lazy-tongs.

In the drawings the invention is shown applied to operate duplicate valves located in a sectional casing, with which the water or gas pipes or mains may be connected.

A A represent flanged halves of the casing adapted to be bolted together and each of which has a tubular coupling projection A′, adapted to receive the pipe or main. B B are circular valve-seats, one in each section of the casing, and B′ B′ the correspondingly shaped valves. Each valve is in Figs. 1 and 2 shown pivotally connected, preferably by short links, with the free ends of the lower end levers of the lazy-tongs C′, whose upper end levers are in these figures shown pivoted in a fixed axis or at a fixed point $C^2$ in a hood $A^2$, mounted on the top of the sectional casing. The casing, which is closed at the bottom, is open at the top and has bolted thereto the hood $A^2$, through which the valve-operating rod D extends into the casing. The hood may be a solid casting and is formed at the top with an interior cross piece or rib *h*, that is bored or perforated in line with the axis of the hood for the passage of the rod D, and is bored or perforated longitudinally for the reception of the bolts or pins $C^2$, on which the upper ends of the lazy-tongs are pivoted. This rod D is connected with the lazy-tongs below the fixed pivot $C^2$ and preferably with the first central joint $C^3$, below said fixed pivot. The upper end of the rod passes through a packing gland D′ and is screw-threaded, as at *d*. A screw-threaded swiveling-nut E, operated by a hand-wheel E′, engages the thread *d* and serves to run the rod D up and down to raise and lower the lazy-tongs to operate the valves. A series of holes *e* in the periphery of the nut E is engaged, as desired, by a thumb-bolt *e′*, passing through its jacket or casing to lock the valve-operating devices in any position. Some such device is desirable, because the thread *d* is cut quite steep to give a quick action of the parts. As in the construction shown, two valves are to be simultaneously operated by the same rod D, the two sets of lazy-tongs are pinned together by the bolt $C^3$, which passes through the intermediate rod. To give the lazy-tongs stiffness, to prevent springing or buckling, they are also preferably pinned together at each joint as shown. With the organization described the relative extent of motion of the valves and their operating-rod may be in the ratio of, say, two and one half to one. I can thus with a comparatively short movement of the rod obtain a relatively great and quick movement of the valves.

In my improved arrangement as the valve rod is raised the valve lifts, but, as stated, through a greater distance. This action is obviously different from that of valves wherein the lazy-tongs are fulcrumed at a point intermediate their length, and the power is applied at one end to effect a movement of the opposite end.

To insure the firm closing of the valves against their seats, I provide the following toggle organization: Each valve has pivoted to it one or more short links G, (two being shown) and the ends of each pair of opposite links on the two valves are respectively jointed to a rod H, working in a guide-bracket H′ on one of the valve-disks B′ and adapted to abut, when the valves are closing, against an adjustable stop I, carried by a plug I′ secured in the bottom of the casing. It may be secured by being leaded in a suitable socket, as shown, $x$ representing the lead. Each stop may consist of a rod I, squared near its upper end and having on its lower end a screw-thread that works in a socket in the plug I′. By applying a key or wrench to the squared end of the rod it may be turned up or down. It should be so related to the rod H that when the valves are in position for closing said rod abuts against the stop-rod and the toggles force the valves firmly against their seats. Of course the structure and its function or operation would be mechanically and practically the same if the ends of the lazy-tongs levers that are connected with the valve were pivoted by means of the short links C on fixed pivots in the hood and the pivot $C^2$ located on the valve, the rod D being connected with the first central joint, as at present. This joint would in the event of this inversion of the parts be the one marked Y. Such modification is indicated in Fig. 4. However the lazy-tongs are connected at their ends, if the free end is connected with the valve and the opposite end suitably held and the rod D connected between the ends the extent of motion of the valve will exceed that of the rod, and this feature constitutes the primary characteristic of my invention.

The valves B′ have lugs $b$ thereon, that run in guides $b'$ on the casing. These guides are preferably made by casting the face of the casing-sections plain and then securing thereto strips $b^2$ to form the guideways. This is the structure shown, $b^3$ being screws that attach the guide-strips to the casing.

The lazy-tongs levers may be cast and preferably have hubs $c$ at the points where the pivot-pins pass through them—that is to say, at such points the levers may be thicker than at intermediate points. The hubs may be on one side only of each lever, though I prefer that they shall be on both sides on account of the convenience in assembling them. The purpose of this structure is to give a clearance between the lever without the use of spacing-washers. The hubs also afford larger bearings for the pivot-bolts.

I do not claim broadly as of my invention an organization involving a valve or valves, one or more lazy-tongs connected therewith, and an actuating rod for operating the lazy-tongs.

I claim as my invention—

1. The combination, substantially as set forth, with the valve and its casing of the lazy-tongs connected at one end to the valve and at the other with a fixed part of the apparatus, a valve-operating rod connected with the lazy-tongs between said two points of connection and means for adjusting the rod to open or close the valve, for the purpose described.

2. The combination, substantially as set forth, with the two valves and the casing of the two lazy-tongs each connected with its valve at one end and at the other with a fixed part of the apparatus, a valve-operating rod connected to both lazy-tongs between said two points of connection and means for adjusting the rod to open or close the valve, for the purpose described.

3. The combination, substantially as set forth, with the valve and its casing of the lazy-tongs connected at one end to the valve and at the other with a fixed part of the apparatus, a valve-operating rod connected with the lazy-tongs between said two points of connection and means for adjusting the rod to open or close the valve, and a toggle device for closing the valve against its seat.

4. The combination, substantially as set forth, with the valve and its casing, of the lazy-tongs connected at one end with the valve and at the other end with the casing, one of said connections being formed by connecting the end levers at different points with the part to which they are attached and the other by pivoting the end levers to the other part, both levers being pivoted in the same axis, and a valve-operating rod or device connected with the lazy-tongs between said two connections.

5. The combination, substantially as set forth, with the two valves and the casing, of two lazy-tongs pinned together at their joints and each connected at one end with the valve and at the other with the casing, one of said connections of each lazy-tongs being formed by connecting the end levers at different points with the part to which they are attached and the other by pivoting the end levers to the other part, both levers being pivoted in the same axis, and a valve-operating device connected to both lazy-tongs at a point between said two connections.

6. The combination, substantially as set forth, of the valve, the lazy-tongs having its end levers at one end separately connected with the valve and its end levers at the opposite end connected to a pivot common to both levers, and a valve-operating rod or device connected with the lazy-tongs between said pivot and valve.

7. The combination, substantially as set forth, of the two valves, the two lazy-tongs pinned together at their joints and each connected at one end to one of the valves and at their opposite ends to a fixed pivot, and a valve-operating device connected to both lazy-tongs at a point between the fixed pivot and the valves.

8. The combination, substantially as set forth, of the two valves, two lazy-tongs, each having its end levers at one end separately connected with one of the valves and its end levers at the opposite end connected to a fixed pivot common to both levers, a valve-operating device connected with both sets of lazy-tongs at a point between the valves and said pivots and the toggle-valve-closing devices located between the two valves.

9. The combination, substantially as set forth, of the two valves, means for opening and closing them, toggle-levers pivoted to the adjacent faces of the valves, a rod connected with said levers, and a stop against which it works.

10. The combination, substantially as set forth, of the two valves, means for opening and closing them, toggle-levers pivoted to the adjacent faces of the valves, a rod connected with said levers, and an adjustable stop against which it works.

11. The combination, substantially as set forth, of the valve, the lazy-tongs connected at one end with the valve and at the other end with a fixed pivot, the screw-threaded valve-operating rod connected with the lazy-tongs between the valve and the fixed pivot, the threaded nut engaging the rod, means for operating the nut to move the rod endwise, and locking devices for holding the rod in the desired position.

12. The combination, substantially as set forth, of the valves, means for opening and closing them, the toggle-levers pivoted on the adjacent faces of the valves, the rod pivotally connected with the ends of the toggle-levers, and the adjustable screw-threaded stop-rod against which the toggle-rod abuts to firmly close the valves.

13. The combination, substantially as set forth, of the casing, the hood, the valve, the lazy-tongs connected with the valve at one end and at the other end pivoted on a pin $C^2$, inserted through the hood, and the adjusting rod passing through the hood and connected with the lazy-tongs.

14. The combination, substantially as set forth, of the casing, the valves, the hood on the casing, the two sets of lazy-tongs, each connected at one end with one of the valves and at the other pivoted on a pin inserted through the hood, and the valve-adjusting rod.

15. The casing and hood having an interior rib or cross-piece apertured or bored transversely in line with the axis of the hood and apertured or bored lengthwise transverse to said axis in combination with the lazy-tongs, their pivot-pins $C^2$, inserted into the last-named apertures, and the adjusting-rod D, passing through the first-named aperture, substantially as set forth.

In testimony whereof I have hereunto subscribed my name.

CHARLES L. ROWLAND.

Witnesses:

EDWARD C. DAVIDSON,
FRANK S. OBER.